US011775350B2

(12) United States Patent
Sodagar (10) Patent No.: US 11,775,350 B2
(45) Date of Patent: Oct. 3, 2023

(54) COMPUTE RESOURCE ESTIMATION FOR FUNCTION IMPLEMENTATION ON COMPUTING PLATFORM

(71) Applicant: TENCENT AMERICA LLC, Palo Alto, CA (US)

(72) Inventor: Iraj Sodagar, Los Angeles, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 87 days.

(21) Appl. No.: 17/028,426

(22) Filed: Sep. 22, 2020

(65) Prior Publication Data

US 2021/0096922 A1    Apr. 1, 2021

Related U.S. Application Data

(60) Provisional application No. 62/907,629, filed on Sep. 28, 2019.

(51) Int. Cl.
*G06F 9/50* (2006.01)
*H04L 67/10* (2022.01)

(52) U.S. Cl.
CPC .............. *G06F 9/5055* (2013.01); *G06F 9/50* (2013.01); *G06F 9/5005* (2013.01); *G06F 9/505* (2013.01);
(Continued)

(58) Field of Classification Search
CPC ........ G06F 9/50; G06F 9/5005; G06F 9/5016; G06F 9/505; G06F 9/5055; G06F 9/5061;
(Continued)

(56) References Cited

U.S. PATENT DOCUMENTS

2007/0294668 A1    12/2007 Mohindra et al.
2014/0215460 A1    7/2014 Birke et al.
(Continued)

FOREIGN PATENT DOCUMENTS

KR    20190033022 A    3/2019

OTHER PUBLICATIONS

Lorido-Botran et al., "A Review of Auto-scaling Techniques for Elastic Applications in Cloud Environment", J Grid Computing 2014, Springer Science+Business Media Dordrecht 2014 (pp. 559-592) (Year: 2014).*
(Continued)

*Primary Examiner* — Charles M Swift
(74) *Attorney, Agent, or Firm* — ARENTFOX SCHIFF LLP (57) ABSTRACT

A method of resource estimation for implementing processing functions is described. The method can include receiving a default value of a resource requirement parameter indicating a default resource requirement for instantiating a reference instance of a processing function on a computing platform or more default parameter values of configuration parameters and input parameters of the processing function, and estimating a current value of the requirement parameter indicating a current resource requirement for instantiating a current instance of the processing function on the computing platform with one or more current parameter values of the configuration parameters and input parameters of the processing function based on the default value of the resource requirement parameter, and the one or more default parameter values and the one or more current parameter values of the configuration parameter and input parameters of the processing function.

20 Claims, 4 Drawing Sheets

(52) U.S. Cl.
CPC .......... *G06F 9/5016* (2013.01); *G06F 9/5061* (2013.01); *G06F 9/5072* (2013.01); *G06F 9/5077* (2013.01); *H04L 67/10* (2013.01)

(58) Field of Classification Search
CPC ................ G06F 9/5072; G06F 9/5077; G06F 2209/5014; H04L 67/10
See application file for complete search history.

(56) References Cited

U.S. PATENT DOCUMENTS

| | | | | |
|---|---|---|---|---|
| 2016/0301624 | A1* | 10/2016 | Gonzalez | G06F 9/5083 |
| 2018/0203739 | A1* | 7/2018 | Brady | G06F 9/45558 |
| 2019/0222621 | A1 | 7/2019 | Kolan et al. | |
| 2020/0304508 | A1* | 9/2020 | Bae | H04L 63/0876 |
| 2020/0341806 | A1* | 10/2020 | Sodagar | H04L 65/80 |
| 2022/0164453 | A1* | 5/2022 | Kammachi Sreedhar | H04L 9/088 |

OTHER PUBLICATIONS

Text of ISO/IEC DIS 23080-8 Network-based Media Processing, Jul. 12, 2019, ISO/IEC ITC 1/SC 29/WG 11 N18857, Coding of moving pictures and audio, Covenorship: UNI (Italy), Emall of convenor; leonardo@chiariglione.org, http://mpeg.chiariglione.org, 156 pgs.

Korean Office Action dated Apr. 5, 2023 in Application No. 10-2021-7032509 with English Translation, 13 pages.

\* cited by examiner

COMPUTE RESOURCE ESTIMATION FOR FUNCTION IMPLEMENTATION ON COMPUTING PLATFORM

INCORPORATION BY REFERENCE

This present disclosure claims the benefit of priority to U.S. Provisional Application No. 62/907,629, "Resource Estimators for Function Implementations in Cloud Platform" filed on Sep. 28, 2019, which is incorporated by reference herein in its entirety.

TECHNICAL FIELD

The present disclosure relates to compute resource estimation methods for implementing processing functions computing platform a computer or a cloud some embodiments are related network-based Media Processing (NBMP).

BACKGROUND

The background description provided herein is for the purpose of generally presenting the context of the disclosure. Work of the presently named inventors, to the extend the work is described in this background section, as well as aspects of the description that may not otherwise qualify as prior art at the tinge of filing, are neither expressly nor impliedly admitted as prior art against the present disclosure.

Multimedia service providers face the challenge of adapting their services to multiple cloud and network service providers to reach their customers. These cloud and network service providers oftentimes their own application programming interfaces (APIs) to assign compute resources to their customers. The Network-based Media Processing (NBMP) standard is being developed to address fragmentation and offer a unified way to perform media processing on top of any cloud platform and on any IP network. NBMP defines a Workflow Manager that can use implementations of ready-made media processing functions and compose them together to create a media processing workflow.

SUMMARY

Aspects of the disclosure provide a method of resource estimation implementing processing functions. The method can include receiving a default value of a resource requirement parameter indicating a default resource requirement for instantiating a reference instance of a processing function on a computing platform with one or more default parameter values of configuration parameters and input parameters of the processing function, and estimating a current value of the resource requirement parameter indicating a current resource requirement for instantiating a current instance of the processing function on the computing platform with one or more current parameter values of the configuration parameters and input parameters of the processing function based on the default value of the resource requirement parameter, and the one or more default parameter values and the one or more current parameter values of the configuration parameters and input parameters of the processing function.

In an embodiment, the resource requirement parameter is one of a computational performance parameter indicating a performance of a central processing unit (CPU) or a graphics processing unit (GPU), a memory size parameter, and a memory access bandwidth parameter indicating a bandwidth between a CPU and a memory.

In an embodiment, the current value of the resource requirement parameter indicating the current resource requirement can be estimated based on the following expression:

$$\text{the current value} = \text{estimator} * \text{the default value},$$

where the estimator is a function of the one or more current parameter values of the configuration parameters and input parameters of the processing function.

In an example, the estimator equals 1 when the default parameter values and the one or more current parameter values of the configuration parameters and input parameters of the processing function are identical. In an example, the estimator is received from a function repository storing media processing functions including the processing function, the function repository belonging to a network based media processing (NBMP) system.

In an example, the estimator, the default value of the resource requirement parameter, and the one or more default parameter values and the one or more current parameter values of the configuration parameters and input parameters are included in a descriptor of a function description of the processing function received from a function repository belonging to a NBMP system.

An embodiment of the method can further include requesting compute resources for instantiating the current instance of the processing, function on a current computing platform with the one or more current parameter values of the configuration parameters and input parameters of the processing function based on the estimated current value of the resource requirement parameter, and instantiating the current instance of the processing function on the current computing platform using the requested compute resources.

Aspects of the disclosure further provide an apparatus comprising circuitry. The circuitry can be configured to receive a default value of a resource requirement parameter indicating a default resource requirement for instantiating a reference instance of a processing function on a computing platform with one or more default parameter values of configuration parameters and input parameters of the processing function, and estimate a current value of the resource requirement parameter indicating a current resource requirement for instantiating a current instance of the processing function on the computing platform with one or more current parameter values of the configuration parameters and input parameters of the processing function based on the default value of the resource requirement parameter, and the one or more default parameter values and the one or more current parameter values of the configuration parameters and input parameters of the processing function.

Aspects of the disclosure further provide a non-transitory computer-readable medium storing instructions that, when executed by a processor, cause the processor to perform the method of resource estimation for implementing processing functions.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

I. Network-Based Media Processing

Aspects of the disclosure describe resource estimation methods related with a network-based media processing (NBMP) framework. The NBMP framework can be employed to initialize and control media processing in a network (e.g., on a cloud platform). For example, a NBMP source describes requested media processing and provides information about the nature and format of media data. In response, an NBMP workflow manager eta establish a media processing workflow and inform the NBMP source that the workflow is ready, and the requested media processing can start. The then start transmitting media to the network for processing.

An NBMP workflow can be understood as a connected graph of media processing each of which perform a well-defined media processing operation. The workflow manager ensures correct operation of the workflow by configuring and monitoring each task as well as a workflow output. The workflow manager is responsible for selection of media processing functions and instantiating the selected functions as tasks based on a workflow description that is received from the NBMP source.

While hiding interactions with underlying cloud computing platform from media service providers, the workflow manage can establish, load, and monitor media processing entities (MPEs) that run the media processing tasks. During a process of establishing the MPEs, the resource estimation methods described herein can be used to estimate an amount of resources useful for instantiating media processing tasks.

Figure 1:
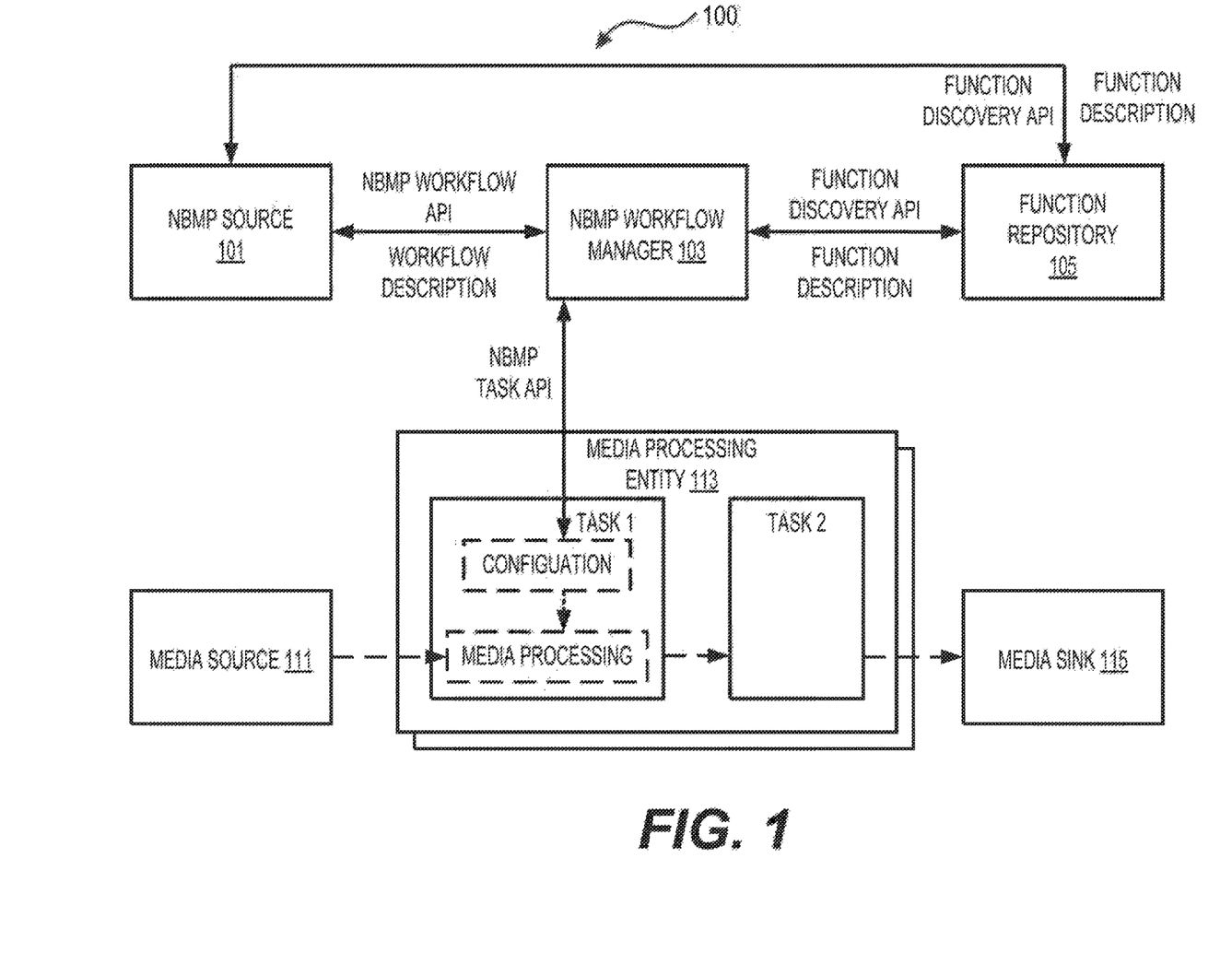
FIG. 1 shows an exemplary data processing system according to an embodiment of the disclosure.

FIG. 1 shows an exemplary NBMP system (100) according to an embodiment of the disclosure. The NBMP system (100) can support existing media delivery methods such as streaming, file delivery, push-based progressive download, hybrid delivery, multipath, and heterogeneous network environments. The NBMP system (100) car also able emerging media applications by providing various cloud-based media processing capabilities such as network-assisted media quality enhancement (e.g., virtual reality (VR) stitching, video up-scaling, mobile edge encoding for adaptive streaming, and content-aware clot transcoding), network-assisted media distribution (e.g., live media ingestion, online transcoding, and media-aware caching), network-assisted media composition (e.g., augmented video streaming, and customized media composition), immersive media handling e.g., network aggregated point cloud media), and the like.

As shown, the NBMP system (100) can include a NBMP source (101), a NBMP workflow manager (103), a function repository (105), a media source (111), a data processing entity (MPE) (113), and a media sink (115). The NBMP system (100) can include additional media source(s), media sink(s), and/or MPEs.

The NBMP source (101) can describe, or otherwise indicate, media processing operations to be performed by the media processing entity (113). The function repository (105) can store various media processing functions. The NBMP source (101) and the NBMP workflow manager (103) can retrieve media processing functions from the function repository (105). A media processing function or a function cart be used for performing a specific media processing process, such as a stitching process in a 360 video streaming service, an artificial intelligence (AI) based video up-scaling process in a video delivery service, or the like.

A media processing task or a task can be a runtime instance of a function that is executed by the MPE (113). An NBMP workflow or a workflow can be represented by a graph a directed acyclic graph (DAG)) of one or more connected task(s) that achieve the requested media processing. The NBMP workflow manager (103) or the workflow manager (103) can provision task(s) and connect the task(s) to create, control, manage and monitor a workflow, for example, based on a workflow description document (WDD).

The media source (111) can provide media content (e.g., media data, supplementary information) to be processed by a workflow. The supplementary information can include metadata or auxiliary information related to the media data. The media source (111) can provide an input to the workflow. The media sink (115) can consume an output of the workflow. The MPE (113) can run one or more media processing task(s) to process the media content, Different entities (e.g., the NBMP Source (101), the workflow manager (103) and the MPE (113)) in the NBMP system (100) can use APIs to invoke and respond to media service requests as shown in FIG. 1. The APIs can include a NBMP workflow API (or a workflow API), a function discovery API, and a task API. The workflow API can provide an interface between the NBMP Source (101) and the workflow manager (103). The task API can provide an interface between the workflow manager (103) and media processing tasks. The function discovery API can provide an interface between the workflow manager (103)/the NBMP Source (101) and the Function Repository (105).

The NBMP interfaces described above can be used to create acid control media processing workflows in the network. The NBNP system (100) can be split into control plane and a media plane (or media data plane). The control plan can include the workflow API, the function discovery API, and the task API.

The workflow API can be used by the NBMP create and control a media processing workflow. The NBMP Source (101) can use the workflow API, the communicate with the workflow manager (103) for configuring and controlling media processing in the network. When the NBMP Source (101) sends a request to the workflow manager (103) by including a workflow resource (WR) in an operation of the workflow API, the workflow manager (103) can parse the WR, the included WDD and corresponding descriptors, and take the appropriate actions according to the requested operation. Then, the workflow manager (103) can acknowledge the request with a response. The workflow API operations can include creating a workflow (e.g., Create Workflow), updating a workflow (e.g., Update Workflow), deleting a workflow (e.g., Delete Workflow), retrieving a workflow (e.g., Retrieve Workflow), and the like.

The function discovery API can provide the means fort the workflow manager (103) and or the NBMP Source (101) to discover media processing functions that can be loaded as part of a media processing workflow.

The task API can be used by the workflow t to configure and monitor task(s) (e.g., a task 1 and a task 2 run by the MPE a runtime. The task API can define interface(s) for configuration of media processing tasks by the workflow manager (103), for example, after the resources for the task are allocated in the MPE (113). Task API operations can include creating a task (e.g., CreateTask), updating a task (e.g., UpdateTask), getting a task (e.g., GetTask), deleting a task (e.g., DeleteTask), and the like.

On the media plane, the media formats, the metadata, and the supplementary information formats between the NBMP Source (111) and task(s), as well as between the tasks can be defined.

A workflow description (WD) can be passed from the NBMP source (101) to the workflow manager (103). The WD can describe information such as input data and output data, functions and other requirements for the workflow.

The workflow manager (103) can receive a WDD from the NBMP source (101) and can build a workflow for requested media processing. In a workflow procedure, media processing functions can be selected, for example, from the function repository (105), and then corresponding media processing tasks cart be configured and distributed to a set of one or more MPEs (e.g., including the MPE (113)).

The set of functions provided by the function repository (105) can be read NBMP source (101) workflow manager (103). In an embodiment, the NBMP source (101) requests the creation workflow using a set of functions in the function repository (105). Accordingly, the NBMP source (101) is configured to select functions for the workflow. The NBMP source (101) can request the creation of the workflow as described below. The NBMP source (101) can use a description of the media processing tasks by which the workflow is to b created, and can specify a connection map to define connections of inputs and outputs of the media processing tasks. When the workflow manager (103) receives the above information from NBMP source (101), the workflow manager (103) can instantiate the media processing tasks based on respective function names and can connect the media processing tasks according to the connection map.

Alternatively, NBMP source (101) can request the creation of a workflow using a set of keywords by which the workflow manager (103) cart construct workflow. Accordingly, the NBMP source (101) may not be aware of a set of functions to be inserted into workflow. The NBMP source (101) can request the creation of the workflow as described below. The NBMP source (101) can use the set of keywords by which the workflow manager (103) can find the appropriate functions, and can specify the requirements of the workflow using suitable workflow description.

When the workflow (103) receives the above information (e.g., the set of keywords) from the NBMP source (101), workflow manager (103) can create the workflow by searching for appropriate functions using the keywords, for example, specified in a processing descriptor. The workflow manager (103) can then use other descriptors in the workflow description to provision the media processing tasks and connect the media processing tasks to create the final workflow.

A processing model of the workflow manager (103) can be described as below.

The workflow manager (103) can discover available media processing functions as below. The NBMP function repository (105) can provide the function discovery interface (or API) to allow external entities to query for a media processing function that can fulfil the requested processing. The workflow manager (103) can have access to a directory service that offers a searchable list of media processing functions. The workflow manager (103) can use the description of the media processing tasks in the workflow description to find the appropriate functions for the workflow.

Selection of the media processing tasks for the workflow can be described below. When a request for media processing is received from the NBMP source (101), the workflow manager (103) can search the function repository (105) to find the list of all available functions that can fulfill the workflow. Using the workflow description from the NBMP Source (101), the workflow manager (103) can find the functions from the function repository (105) to implement the workflow, which can depend on the information for media processing from the NBMP Source (101). The information for media processing can include the input and output description, the description of the requested processing, and the information in other descriptors for functions in the function directory (105). Mapping of the source requests to appropriate media processing tasks to be included in the workflow can be a part of the implementation of the NBMP in the network. To reference and link input sources with input port names and output port names at the tune of task creation, the input-ports and output-polls can be used to make references to the input streams.

A search for appropriate functions to be instantiated as tasks can be performed by the workflow manager (103) using a function discovery API. Alternatively, the workflow manager (103) can retrieve detailed information of some or all suitable functions in the function repository (105) using the function discovery API. The workflow manager (103) can then compare the information for media processing from the NBMP source (101) with different descriptors of each function.

Selected media processing tasks can be configured in the workflow. When the functions to be included in the workflow are identified, the NBMP workflow manager (103) can instantiate the functions as respective tasks and, configure the tasks so that the tasks can be added to the workflow. The NBMP workflow manager (103) can extract the configuration data from the media processing information received from the NBMP source (101) and configure the corresponding tasks. The configuration of the Tasks can be performed using a task API (e.g., NBMP task API).

Task allocation and distribution can be described below. The workflow manager (103) can use the workflow to perform processing deployment and configure the media processing entities. In an example, for computationally intensive media processing requests, the workflow manager (103) can set up multiple computational instances and distribute a workload among the multiple computational instances. Thus, the workflow manager (103) can connect and configure the multiple computational instances as needed. In an example, the workflow manager (103) allocates a same task to multiple instances and provisions a load balancer to distribute the workload among the multiple instances using a chosen scheduling mechanism. In an alternative example, the workflow manager (103) allocates different operations of the same task to different instances (e.g., parallel operations). In both examples described above, the workflow manager (103) can set up the workflow paths between the instances, and thus the suitable workload can be successfully realized. The workflow manager (103) can configure the tasks to push the processed media data/streams (or make them available through a pull mechanism) to a next task in the workflow graph.

When the workflow manager (103) receives a WDD from the NBMP Source (101), the workflow manager (103) can perform a selection of media processing functions to be inserted into the workflow. When the list of tasks to be included in the workflow is compiled, the workflow manager (103) can then connect the tasks to prepare the workflow.

Figure 2:
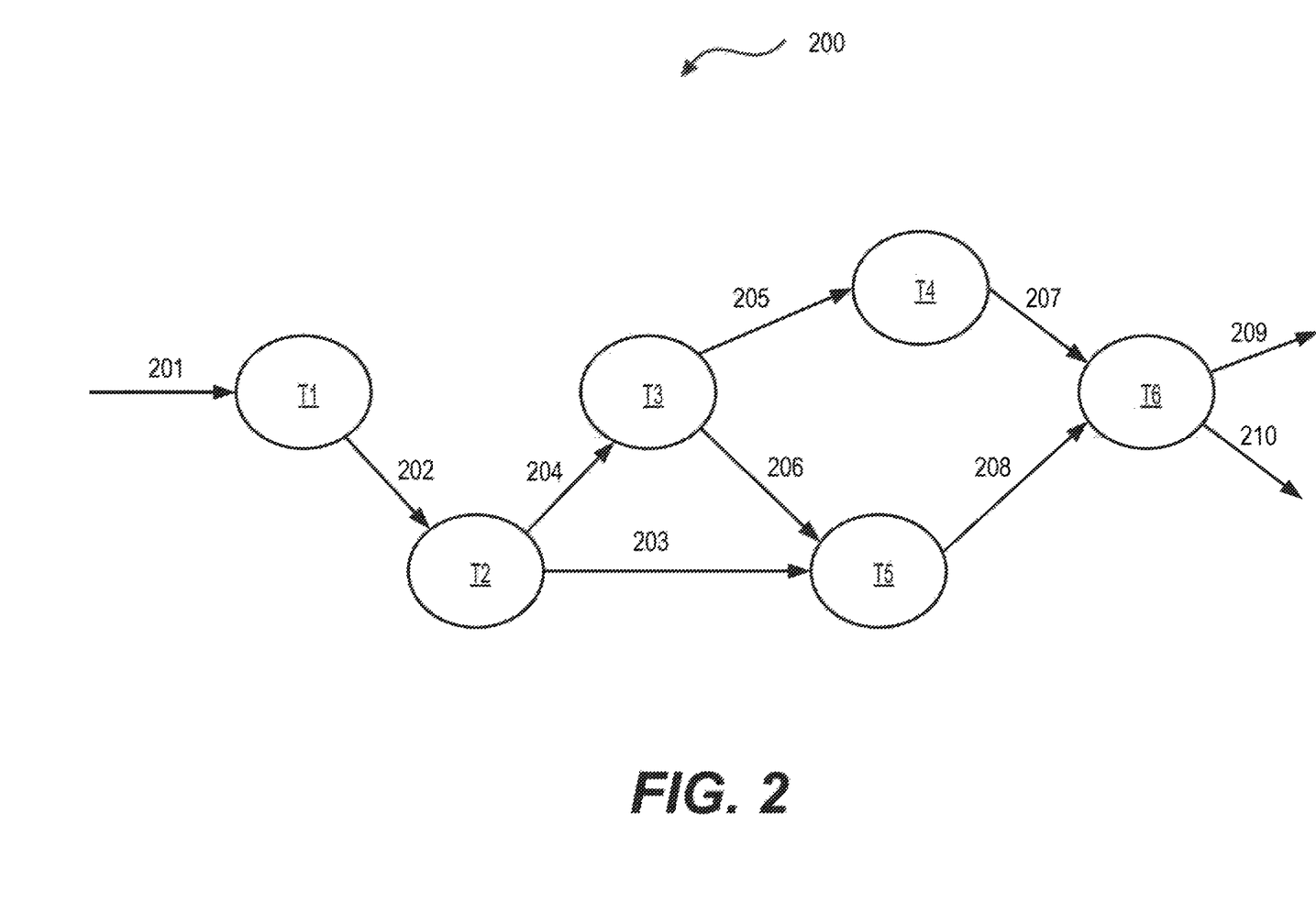
FIG. 2 shows an example of a workflow according to an embodiment of the disclosure.

The workflow manager (103) can generate a workflow, for example, as represented by a graph (e.g., a DAG). FIG. 2 shows an example of a graph (e.g., a DAG) (200) according to an embodiment of the disclosure. The DAG (200) can include a plurality of nodes (T1)-(T6) and a plurality of links (or connections) (202)-(208). In an example, the DAG (200) represents the workflow (200).

Each node of the DAG (200) can represent a media processing task in the workflow (200). A link (e.g., the link (202)) connecting a first node (e.g., the node (T1)) to a second node (e.g., the node (T2)) in the DAG (200A) can represent a transfer of an output of the first node (e.g., the node (T1)) as an input to the second node (e.g., the node (T2)).

In general, a workflow can include any, suitable number of input(s) (or workflow input(s)) and any suitable number of output(s) (or workflow output(s)). The workflow input(s) can be connected to the media source (111), other workflow(s) and/or the like, and the workflow output(s) can be connected to the media sink (115), other workflow(s), and/or the like. The workflow (200) has an input (201) and outputs (209) and (210). The workflow (200) can have one or more outputs from intermediate nodes in some embodiments.

II. Resource Estimation for Implementation of Functions on Cloud Platform

In order to implement or instantiate media processing functions on a cloud platform, resource estimation, can be performed to determine an amount of compute resources needed for the implementation. For example, based on a media processing request from the NBMP source (101) in the FIG. 1 example, the NBMP workflow manager (103) can select one or more media processing functions from the function repository (105). Subsequently, the NBMP workflow manager (103) can estimate how many compute resources are required for converting the selected media processing functions to tasks. Based on an amount of estimated compute resources, the NBMP workflow manager (103) can request compute resources from a cloud platform that will host the tasks.

For example, in response to the request for the compute resources, a resource management function (e.g., a resource manager) of the cloud platform may allocate compute resources (e.g., resources of computational, memory, network, and the like) accordingly. For example, virtual machines may be provisioned and assigned for executing the tasks. Those virtual machines can serve as one or more MPEs in the NBMP framework (100). When those allocated resources becomes available to the NBMP workflow manager (103), the NBMP workflow manager (103) can instantiate the selected media processing functions to start the tasks.

Generally, cloud platforms for media processing may be owned by different cloud operators, and thus have diverse hardware modules that can be updated frequently. Performance of a media processing function ((e.g., a media processing library) can vary on different hardware platforms, for example, depending on central processing unit (CPU), graphic processing unit (GPU), L1 and L2 cache, memcached, memory bandwidth, hardware accelerate modules, system clock, CPU or GPU clock, network configurations, or other parameters. In other words, for a given performance requirement (e.g., frame rate, and picture resolution), different compute resources may be needed on different cloud platforms. Therefore, using a single set of metrics for profiling resource requirements of a media processing function for different hardware systems used in various cloud platforms is difficult or unfeasible.

On the other side, resource demand of an implementation or instance of a media processing function can depend on complexity (or nature) of to-be-performed processing work. The complexity of the processing work can depend on algorithms used in the media processing function (not change for this media processing function) and configurations of the processing work (which can vary). In this disclosure, resource demand or requirements of an implementation or instance of a media processing function is referred to as a complexity of the implementation or instance of the media'processing function, or a complexity of the media processing function corresponding to the specific instance or implementation.

Taking the media processing function of a video encoder as an example, complexity of a processing work can vary depending on a size of input data (input parameters) and processing configurations (configuration parameters). For example, the size of input data can be represented by a frame size, a frame rate, a bit depth, a number of color components, a component color format, and the like. The processing configurations can include number of reference frames for prediction, coding modes (e.g., number of contest profiles for arithmetic encoding, and sizes of the context profiles), number of tiles and tile groups, a target bitrate, and the like. Therefore, required resources for implementation of a media processing function can vary when input parameters and configuration parameters of this media processing function vary.

Accordingly, in a resource estimation scheme disclosed herein, to profile compute resource requirements for implementation of a media processing function with a given configuration (input parameters and configuration parameters), a reference instance of the media processing function with a reference configuration is defined and used as a baseline (reference), The reference configuration can correspond to a set of reference input parameters and configuration parameters. Resource requirements of a current instance of the media processing function with the given configuration can be profiled with respect to resource requirements of the reference instance with the reference configuration.

In addition, in the resource estimation scheme, resource requirements of a current instance can be defined to be a function of input parameters and configuration parameters of the media processing function. Such a function can be referred to as a resource estimation function (REF). In other words, when a configuration (input parameters and configuration parameters) of the media processing function change, different resource requirements of respective instances can be determined based the REF with respect to the resource requirements of the baseline instance.

In this disclosure a reference configure instance can be said to be a default configuration of a default instance. Reference input parameters and reference configuration parameters of the reference configuration can be said to be default input parameters and delimit configuration parameters of the default instance. Resource requirements of the reference instance can be said to be default resource requirements of a default instance On the other side, a given configuration of a current instance can be referred to a configuration input parameters and configuration parameters of the given configuration of the current instance can be referred to as current input parameters and current configuration parameters. Resource requirements current instance can be referred to as current resource requirements of the current instance.

In the resource estimation scheme, for a certain media processing function, default resource requirements can be provided corresponding set of default input parameters and configuration parameters for instantiating a default instance of the media processing function. In an example, the default resource requirements is derived with a target perform requirement defined far the media processing function.

Generally, resource requirements for instantiating a media processing function can be specified based on a set of metrics, such as a measure of computation performance of a CPU or GPU, for example, in terms of floating point operations per second (FLOPS), a memory size (e.g., random access memory (RAM)), a memory access bandwidth (between a CPU and a memory), of the like. Values of those metrics for indicating the resource requirements can be referred to as resource requirement parameters or resource parameters. According, the default source requirements can be represented by a set of default resource requirement parameters.

The default resource requirements can be derived using analytic methods considering algorithms of the function and the delimit configuration parameters. Alternatively additionally, experimental methods can be employed to determine the default resource requirements corresponding to the default configuration parameters. In an example, the derivation of the default resource requirement can be based on a reference cloud platform with certain hardware and software configurations.

In addition, in the resource estimation scheme, a set of REFs corresponding to different resource requirements metrics can be provided together with the media processing function. Each REF can define a relationship between values of the respective resource requirement metric and values of variable configuration parameters (e.g., input parameters and configuration parameters) corresponding to different instances of the media processing function. In an example, a REF can be provided in form of an equation. Accordingly, a metric of current resource requirements can be calculated using the REF with given (current) configuration parameters. In an example, a REF can be provided in form of a lookup table including entries each include a pair of a metric value and a set of current configuration parameter values.

During a resource estimation process for instantiating a media processing function, the resource estimation scheme can be used in the following way. The NBMP workflow, manager (103) in the FIG. 1 example can receive values of default resource requirements, default input parameters, and default configuration parameters together with one or more REFs (or information indicating REFs) from the function repository (105). In addition, the NBMP workflow manager (103) can receive a set of current input parameters and configuration parameters corresponding to a current instance of the media processing function from the NBMP source (101). Based on those available information, the NBMP workflow manager (103) can estimate metric values of current resource requirements of the current instance.

In an embodiment, the resource estimation scheme can be implemented as follows. For a media processing function to be instantiated as a current instance, let input parameters of the current instance be defined by a set $\{p\}$. The set $\{p\}$ can include parameters such as picture width, picture height, frame rates, bit depth, number of color components, sample ratios of the color components, or the like. Let configuration parameters of the current instance be defined by a set $\{c\}$. The set can include parameters such as target bit rate, encoding modes, selection modes, reference frames number, or the like.

In addition, for a reference instance of the media processing function, let default input parameters of the reference instance be defined by $\{p_0\}$. Let default configuration parameters of the reference instance be defined by $\{c_0\}$.

Further, let default resource requirements for instantiating the reference instance with the default input parameters $\{p_0\}$ and configuration parameters $\{c_0\}$ be defined by default resource requirement parameters $\{h_0, m_0, b_0\}$. The default resource parameter $h_0$ can be a default computational complexity (computational performance) of a CPU or GPU, for example, expressed as a number of FLOPS. The default resource parameter $m_0$ can be a default memory size, for example, expressed as a number of megabytes (MB). The default resource parameter $b_0$ can be a CPU-memory access bandwidth.

Given the above current parameters $\{p\}$ and $\{q\}$ of the current instance, and default parameters $\{p_0\}$, $\{c_0\}$, and $\{h_0, m_0, b_0\}$ of the reference instance, current resource requirements of the current instance can be determined according to the following REFs:

$$\{h, m, b\} = \{E_h(\{p\}, \{c\}) \cdot h_0, E_m(\{p\}, \{c\}) \cdot m_0, E_b(\{p\}, \{c\}) \cdot b_0\}.$$

Alternatively, the above expression can be represented in the following way:

$$h = E_h(\{p\}, \{c\}) \cdot h_0,$$

$$m = E_m(\{p\}, \{c\}) \cdot m_0,$$

$$b = E_b(\{p\}, \{c\}) \cdot b_0.$$

The parameters $\{h, m, b\}$ are current resource parameters representing the current resource requirements for instantiating the current instance with the current parameters $\{p\}$ and $\{c\}$.

In the REFs, the variables $E_h$, $E_m$, and $E_b$ are referred to as resource estimation estimators (REEs), or estimators, and can be defined per function in the function repository (105) in the FIG. 1 example. Each estimator corresponds to one of the three resource requirements metrics: computational performance of CPU or GPU, memory size, and CPU-memory access bandwidth. Accordingly, the estimators $E_h$, $E_m$, and $E_b$ can be referred to as computational estimator, memory estimator, and bandwidth estimator, respectively.

Using a stitching function as an example of the media processing function, derivation and definition of the REFs are explained as follows. The stitching function can be used for stitching two neighboring frames together along the vertical direction, for example, in media processing of 360 video streaming. Computational complexity (resource requirements) for implementing the stitching function can depend on a picture height and a frame rate of input data. Accordingly, the computational estimator $E_h$ and the memory estimator $E_m$ for the stitching function can be derived as:

$$E_h = \frac{h}{h_0}, \frac{f}{f_0}$$

$$E_m = \frac{w}{w_0}, \frac{h}{h_0}, \frac{f}{f_0}$$

where the parameters $h_0$, $f_0$, and $w_0$ are default input parameters, and denote a default picture height, a default frame rate, and a default picture width corresponding to a reference instance of the stitching function; the parameters h, f, and w are current input parameters, and denote a current picture height, a current frame rate, and a current picture width corresponding to a current instance of the stitching function.

As can be seen, the computational estimator and the memory estimator are functions of the current input parameters. When the current input parameters are identical with the default input parameters, the computational estimator and the memory estimator can have a value of 1 in this example. Accordingly, the respective current resource parameters can be the same as the respective reference resource parameters.

In another example, the same stitching function is used for stitching a sequence of n frames. The number n can be 3, 4, or the like. The stitching operation is performed between two neighboring frames. In total, n−1 stitching operations are performed to connect the n frames together. Under such a configuration, the computational estimator $E_h$ and the memory estimator $E_m$ for the stitching function can be derived as:

$$E_h = (n-1) \cdot \frac{h}{h_0} \cdot \frac{f}{f_0},$$

$$E_m = \frac{n}{2} \cdot \frac{w}{w_0} \cdot \frac{h}{h_0} \cdot \frac{f}{f_0}.$$

In another example, a function of a video encoder is being considered as an example of the media processing function. Computational complexity (resource requirements) of the video encoder function can be a factor of input frame width w, frame height h, and frame rate f. Accordingly, the computational estimator $E_h$ and the memory estimator $E_m$ for this video encoder function can be:

$$E_h = \frac{w}{w_0} \cdot \frac{h}{h_0} \cdot \frac{f}{f_0},$$

$$E_m = \frac{w}{w_0} \cdot \frac{h}{h_0} \cdot \frac{f}{f_0}.$$

Accordingly, the computational complexity of encoder function by the factor of the frame width w, frame height h, and frame rate f. If each of the frame width w, frame height h, and frame rate f doubles, the resources requited for real-time processing of respective input video would increase by 8 times.

For the video encoder function, if the number of reference frames is increased, from 1 to k, then the memory estimator $E_m$ becomes:

$$E_m = (k+1) \cdot \frac{w}{w_0} \cdot \frac{h}{h_0} \cdot \frac{f}{f_0}$$

It is noted that, in different embodiments, resource requirement metrics used for indicating resource requirements for instantiating functions can be different. For example, for a same function, different metrics may be defined (e.g., different definitions and/or different in different NBMP systems, and the number of the vary in different NBMP systems. Or, for different functions in a same NBMP system, different metrics (e.g., different numbers and/or different definitions) can be employed. Therefore, REFS and REEs can accordingly vary from function to function, or from NBMP system to NBMP system.

In addition, input parameters and configuration parameters of a media processing fun be defined per media processing function, and thus can vary for different media processing functions.

III. Including Estimators in Function Description

In various embodiments, resource estimation estimators (e.g., $E_h$, $E_m$, and $E_b$), and default resource estimation parameters (or default parameters) (including default input parameters $\{p_0\}$, default configuration parameters $\{c_0\}$, and default resource parameters (e.g., $\{h_0, m_0, b_0\}$)) can be provided as part of a function description associated with a respective media processing function . For example, the media processing function can be provided by a service provider, for example, in form of a program or a library of programs. This service provider can determine and provide and default parameters as an associated part of the media processing function.

In an embodiment, estimators a default parameters of a media processing function are included in one or more descriptors of a function description of the media processing function in the NBMP system (100) in the FIG. 1 example.

For example, the description of the media processing function can be stored in the function repository (105), and include a set of descriptors for describing the media processing function. The set of descriptors, in one example, can include one or more of the following, descriptors: general, input, output, processing, requirements, configuration, client-assistance, assertion, variables, events, and security. As an example, the NBMP standard developed by the Moving Picture Coding Experts Group (MPEG) specifies standardized function descriptions and respective descriptors for a fun in a function repository.

In an example, the input descriptor can include two arrays of objects: one for media inputs and one for metadata inputs. Similarly, the output descriptor can include two arrays of objects: one for the media outputs and one for metadata outputs. For example, the input or output media-parameters objects can include stream-id, name, keywords, mime-type, video-format, audio-format, image-format ac-type, protocol, throughput, buffer-size catching-server-url, or the like. The input or output metadata-parameter objects can include stream-id, name, keywords, mime-type, coder-type, protocol, max-size, min-interval, caching-server-url, scheme-uri, or the like.

In an example, the configuration descriptor provides details of parameters for configuring the function.

In an example, the requirements descriptor provides requirements parameters listed in Table 1.

TABLE 1

| Requirements Descriptor | |
|---|---|
| Name of grouped parameters | Example Parameters |
| Flow Control Requirements | typical-delay, min-delay, max-delay, typical-throughput, min-throughput, max-throughput, averaging-window. |
| Hardware Requirements | Number of virtualized CPUs, number of virtualized GPUs, memory size, local disk size, identifier of the geographical location of the data centre in which the Task is to be executed. |
| Security Requirements | Boolean values indicating whether TLS or DTLS, IPSec, or MPEG Common Encryption is used. |

TABLE 1-continued

Requirements Descriptor

| Name of grouped parameters | Example Parameters |
|---|---|
| Workflow/Task Requirements | workflow execution modes (e.g., 'streaming', 'step', or 'hybrid'), Boolean value of whether functions can be fused or split, Boolean value of whether the inputs and outputs of a task can be modified or enhanced (e.g., media transcoding, media transport buffering for synchronization, or the like). |
| Resource Estimation (Resource Estimator) | default resource estimation parameters and resource estimation estimators for estimating compute resources by comparing to a baseline reference instance. |

An example of the group of the resource estimation parameters at the bottom of Table 1 is shown in Table 2.

TABLE 2

Resource Estimator Parameters

| Name | Type | Cardinality |
|---|---|---|
| Default values | Array | 1 |
| Computational estimator ($E_h$) | string | 0-1 |
| Memory estimator ($E_m$) | string | 1 |
| Bandwidth estimator ($E_b$) | string | 0-1 |

Cardinality:
1 = exactly one,
0-1 = zero or one

In Table 2, the default values can include a list of name-value pairs of default resource estimation parameters used as a reference for the resource estimators listed in Table 2. For example, the default resource estimation parameters can include default input parameters {p0}, default configuration parameters {c0}, and default resource parameters (e.g., {h0, m0, b0}).

In Table 2, the next 3 entries includes information of the estimators $E_h$, $E_m$, and $E_b$ for the media processing function. In an example, the next 3 entries provide estimator equations for each of the estimators $E_h$, $E_m$, and $E_b$. For example, for the estimator $E_h$, the estimator equation can be described as a programming equation:

$$E_h = (\text{height}/\text{height0})*(\text{frame\_rate}/\text{frame\_rate0}),$$

which corresponds to the equation:

$$E_h = \frac{h}{h_0} \cdot \frac{f}{f_0}.$$

In another example, the next 3 entries provide estimator expressions for each of the estimators $E_h$, $E_m$, and $E_b$. For example, for the estimator $E_h$, the estimator expression can be described as a programming expression:

$$(\text{height}/\text{height0})*(\text{frame\_rate}/\text{frame\_rate0}),$$

which corresponds to the equation:

$$\frac{h}{h_0} \cdot \frac{f}{f_0}.$$

In an embodiment, one ore of the input descriptor, the output descriptor and the configuration descriptor of the media processing function also include the group of resource estimation parameters. The resource estimation parameters in Table 2 have the same name, format, and semantics for the input, output, configuration and requirements descriptors.

It is noted that the compute resource estimation scheme disclosed herein is not bunted to media processing functions or NBMP systems although media processing functions in NBMP systems are used as examples for explanation the compute resource estimation scheme. For any type of functions, applications, software, program libraries or the like used for various processing purposes, the compute resource estimation scheme can be employed for resource estimation in order to request and allocate adequate compute resources addition, the compute resources can be cloud-based or non-cloud based (e.g., resources of a computer, or a group of computers).

Figure 3:
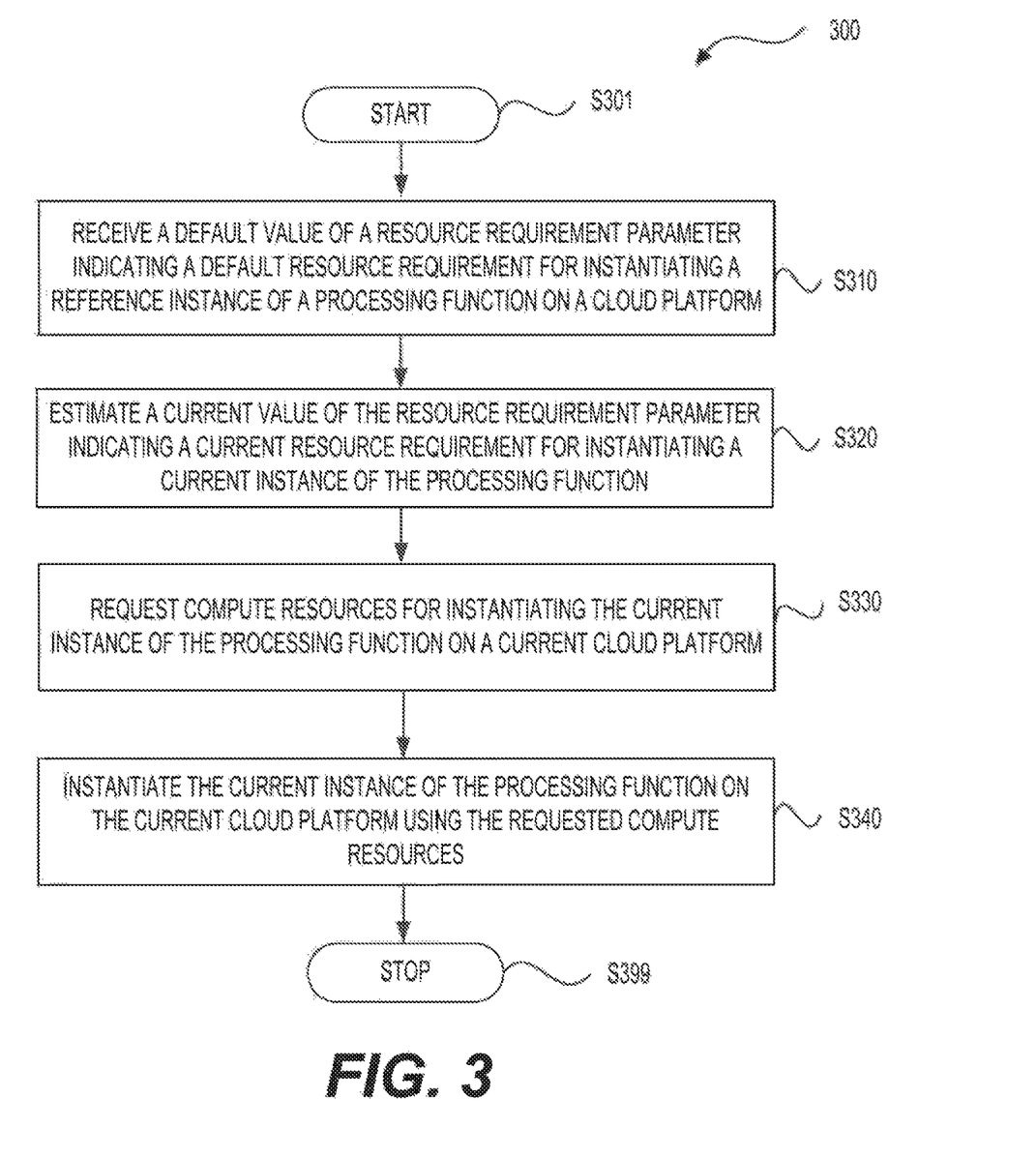
FIG. 3 shows an example process of resource estimation for implementing a processing function according to an embodiment of the disclosure.

IV. Example Processes of Compute Resource Estimation for Function Implementation FIG. 3 shows an example process (300) of compute resource estimation for implementing a processing function according to an embodiment of the disclosure. The processing function can be a media processing function, or can be one of other types of functions for non-media applications. In one example, the process 300 can be performed by the NBMP workflow manager (103) in the FIG. 1 example. In other examples, the process 300 can be performed by an entity not belonging to NBMP systems. Such an entity plays the role of the NBMP workflow manager (103) and provides services of instantiating processing functions as tasks. The process (300) can start from (S301), and proceed to (S310).

At (S310), a default value of a resource requirement parameter can be received. The default value of the resource requirement parameter can indicate a default resource requirement for instantiating a reference instance of the processing function on a computing platform (e.g., a cloud platform). The reference instance can be instantiated with a set of one or more default parameter values of configuration parameters and input parameters of the processing function.

In addition, the set of default parameter values of the configuration parameters and input parameters can also be received at (S310). An example, the default value of the resource requirement parameter and the default parameter values of the configuration parameters and input parameters can be received from the function repository (105) in the FIG. 1 example. In another example, the default value of the resource requirement parameter and the default parameter values of the configuration parameters and input parameters can be received from a source irrelevant with any NBMP systems.

At (S320), a current value of the resource requirement parameter can be estimated. The current value of the resource requirement parameter can indicate a current resource requirement for instantiating a current instance of the processing function on the computing platform. The current instance can be instantiated with a set of one or more current parameter values of the configuration parameters and input parameters of the processing function. In addition, the estimation of the current value of the resource requirement parameter can be based on the default value of the complexity parameter, and the default parameter values and the current parameter values of the configuration parameters and input parameters of the processing function.

For example, an estimator corresponding to the resource requirement parameter can be received, for example, from motion repository (105) or a source irrelevant with NBMP systems. The estimator can be a function of the one or more current parameter values of the configuration parameters and input parameters of the processing function. Accordingly, the estimation of the current value of the resource requirement parameter can be based on the expression:

the current value=estimator*the default value.

As an example, the current parameter values the configuration parameters and input parameters of the processing function can be received from a user of the processing function, such as the NBMP source (101) in the FIG. 1 example.

At (S330), compute for instantiating the current instance of the processing function on a current computing platform can be requested. The request can be based on the estimated current value of the resource requirement parameter. For example, the NBMP workflow manager (103) can, send the request to the current computing platform using an API by the current computing platform.

In an example, the estimated current value of resource requirement parameter is sent to the computing platform. In an example, a transformed value indicating the requested resources is sent to the computing platform. For example, the current computing platform may have a specific API, and use different metrics for indicating compute resources than the metrics (e.g., resource requirement parameters) used for the estimation. The NBMP workflow manager (103) can translate the estimated current value of the resource requirement parameter to a value of the metric used by the computing platform, and include the transformed value in the request.

In an example, different from the process (300), the NBMP workflow manager (103) may forward the estimator, the default parameter values of the resource requirement parameter and the input and configuration parameters, and the current parameter values of the input and configuration parameters to the computing platform. The platform performs estimation (similar to operations at (S320)) based on the received estimator and default and current parameter values.

In response to the request, the current computing platform can allocate compute resources according to match resources indicated by the estimated current value of the resource requirement parameter. As a result, the requested compute resources become available, for example, to the NBNP workflow manager (103).

At (S340), the current instance of the processing function can be instantiated on the current computing platform using the requested compute resources. The process (300) can proceed to (S399) and terminate at (S309).

In the example of the process (300), one resource requirement parameter is described. However, in other examples, the number of resource requirement parameters used for profiling required resources for implementing, a function can be more than one. Accordingly, a default value and a resource estimation estimator, can be provided for each of the multiple resource requirement parameters during a resource estimation process.

V. Computer System

The methods, embodiments, entities, or functions disclosed herein may be implemented by processing circuitry (e.g., one or more processors or one or more integrated circuits). In one example, the one or more processors, execute a program that is stored in a non-transitory computer-readable medium to perform the methods, embodiments, or functions disclosed herein. The program can be coded using any suitable machine code or computer language, that may be subject to assembly, compilation, baking, or like mechanisms to create code comprising, instructions that can be executed directly, or through interpretation micro-code execution, and the like by one or more CPUs, GPUs, and the like. The instructions can be executed on various types of computers or components thereof, including, for example, personal computers, tablet computers, servers, smartphones, gaming devices, internet of things devices, and the like.

Figure 4:
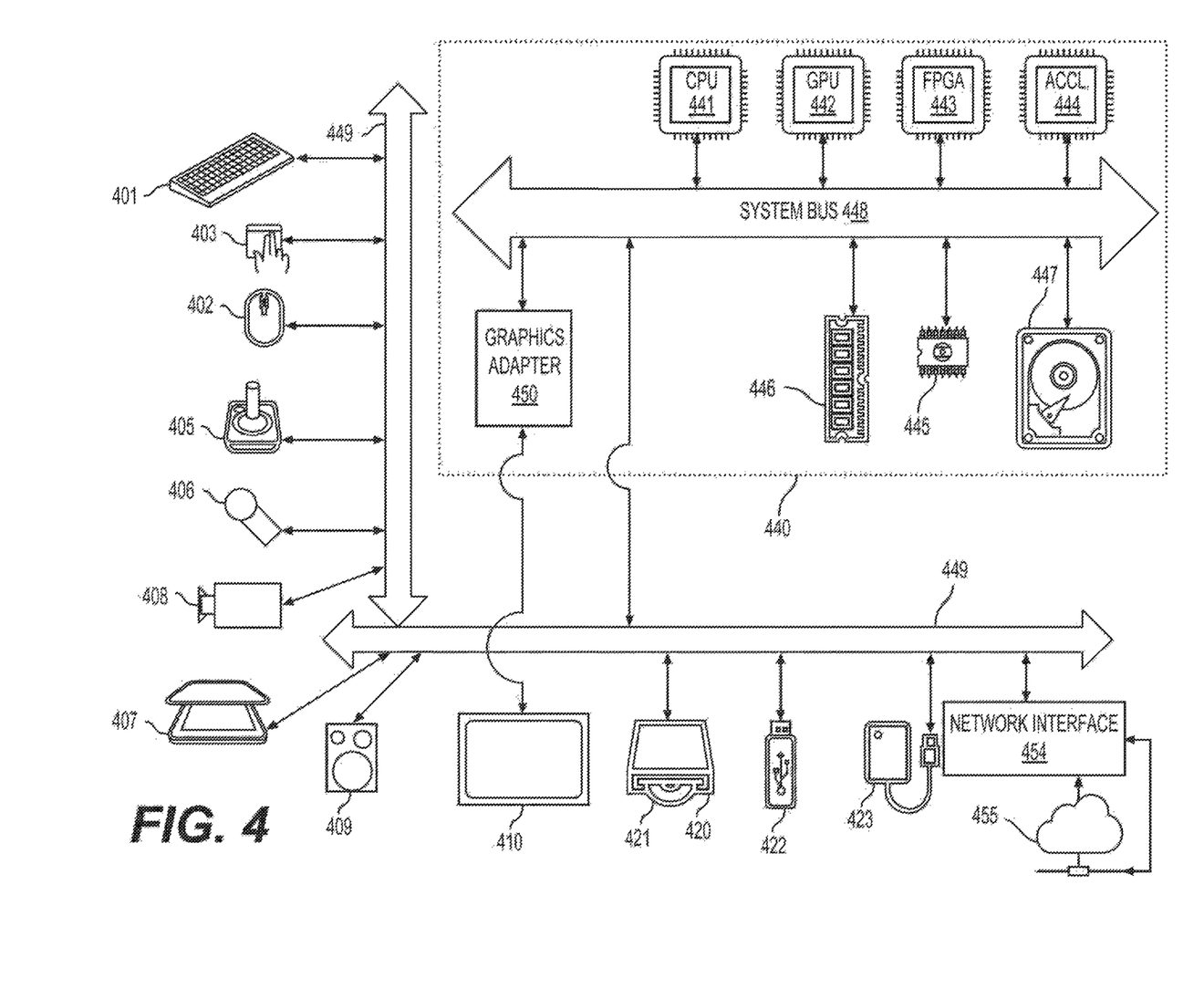
FIG. 4 shows a schematic illustration of a computer system according to an embodiment of the disclosure.

FIG. 4 shows a computer system (400) suitable for implementing certain embodiments of the disclosed subject matter. The components shown in FIG. 4 for computer system (400) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (400).

Computer system (400) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain, from a still image camera), video (such as two-dimensional video, three-dimensional video including stereoscopic video).

Input human interface devices may include one or more of (only one of each depicted): keyboard (401), mouse (402), trackpad (403), touch screen (410), data-glove (not shown), joystick (405), microphone (406), scanner (407), camera (408).

Computer system (400) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (410), data-glove (not shown), or joystick (405), but there can also be tactile feedback devices that do not serve as input devices), audio output devices (such as: speakers (409), headphones (not depicted)), visual output devices (such as screens (410) to include CRT screens, LCD screens, plasma screens, OLED screens, each with or without touch-screen input capability, each with or without tactile feedback capability-some of which may be capable to output two dimensional visual output or more than three dimensional output through means, such as stereographic output; virtual-reality glasses (not depicted), holographic displays and smoke tanks (not depicted)), and printers (not depicted).

Computer system (400) can also include human accessible storage devices and their associated media such as optical media including CD/DVD ROM/RW (420) with CD/DVD or the like media (421), thumb-drive (422), removable hard drive or solid state drive (423), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (400) can also include an interface (454) to one or more Communication networks (455). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adaptors that attached to certain general purpose data ports or peripheral buses (449) (such as, for example USB ports of the computer system (400)); others are commonly integrated into the core of the computer system (400) by attachment to a system bus as described below (for example Ethernet interface into a PC computer system or cellular network interface into a smartphone computer system). Using any of these networks, computer system (400) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described herein.

Aforementioned human interface devices, human-accessible storage devices, and network interfaces can be attached to a core (440) of the computer system (400).

The core (440) can include one or more Central Processing Units (CPU) (441), Graphics Processing Units (GPU) (442), specialized programmable processing units in the loan of Field Programmable Gate Areas (FPGA) (443), hardware accelerators (444) for certain tasks, graphics adapters (450), and so forth. These devices, along with Read-only memory (ROM) (445), Random-access memory (446), internal mass storage such as internal non-user accessible hard drives, SSDs, and the like (447), may be connected through a system bus (448). In some computer systems, the system bus (048) can be accessible in the km of one or more physical plugs to enable extensions by additional CPUs, GPU, and the like. The peripheral devices can be attached either directly to the core's system bus (448), or through a peripheral bus (449). In an example, the screen (410) can be connected to the graphics adapter (450). Architectures for a peripheral bus include PCI, USB, and the like.

CPUs (441), GPPs (442), FPGAs (443), and accelerators (444) can execute certain instructions that, in combination, can make up the aforementioned computer code. That computer code can be stored in ROM (445) or RAM (446). Transitional data can be also be stored in RAM (446), whereas permanent data can be stored for example, in the internal mass storage (447). Fast storage and retrieve to any of the memory devices can be enabled through the use of cache memory, that can be closely associated with one or more CPU (441), GPU (442), mass storage (447), ROM (445), RAM (446), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (400), and specifically the core (440) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (440) that are of non-transitory nature, such as core-internal mass storage (447) or ROM (445). The software implementing various embodiments of the present disclosure can be stored in such devices and executed by core (440). A computer-readable medium can include one or more memory devices or chips, according to particular needs. The software can cause the core (440) and specifically the processors therein (including CPU, GPU, FPGA, and the like) to execute particular processes or particular parts of particular processes described above, including defining data structures stored in RAM (446) and modifying such data structures according, to the processes defined by the software. In addition or as an alternative, the computer system can provide functionality as a result of logic hardwired or otherwise embodied in a circuit (for example: accelerator (444)), which can operate in place of or together with software to execute particular processes or particular parts of particular processes described herein. Reference to software can encompass logic, and vice versa, w=here appropriate. Reference to a computer-readable media can encompass A circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure will this be appreciated that those ski led in the art will be able to numerous systems and methods which, although explicitly shown or described herein, embody the principles of the disclosure and are thus within the spirit and scope thereof.

What is claimed is:

1. A method, comprising:

receiving a requirements descriptor of a network-based media processing (NBMP) function from a function repository of an NBMP framework, the requirements descriptor including a default value of a resource requirement parameter indicating a default resource requirement for instantiating a reference instance of the NBMP function on a computing platform with one or more default parameter values of configuration parameters and default input parameters of the NBMP function, the default input parameters of the NBMP function include at least one of a default picture height, a default frame rate, or a default picture width; and estimating a current value of the resource requirement parameter indicating a current resource requirement for instantiating a current instance of the NBMP function on the computing platform with one or more current parameter values of the configuration parameters and current input parameters of the NBMP function by scaling the default value of the resource requirement parameter included in the requirements descriptor using an estimator that is a function of at least one of (i) a ratio of the default picture height to a picture height of the current instance of the NBMP function, (ii) a ratio of the default frame rate to a frame rate of the current instance of the NBMP function, or (iii) a ratio of the default picture width to a picture width of the current instance of the NBMP function.

2. The method of claim 1, wherein the resource requirement parameter is one of:

a computational performance parameter indicating a performance of a central processing unit (CPU) or a graphics processing unit (GPU), a memory size parameter, or a memory access bandwidth parameter indicating a bandwidth between a CPU and a memory.

3. The method of claim 1, wherein the estimating the current value of the resource requirement parameter includes:

estimating the current value of the resource requirement parameter indicating the current resource requirement based on the following expression:

the current value=estimator*the default value, where the estimator is a function of the one or more current parameter values of the configuration parameters of the computing platform, (i) the ratio of the default picture height to the picture height of the current instance of the NBMP function, (ii) the ratio of the default frame rate to the frame rate of the current instance of the NBMP function, and (iii) the ratio of the default picture width to the picture width of the current instance of the NBMP function.

4. The method of claim 3, wherein the estimator equals 1 when the one or more default parameter values and the one or more current parameter values of the configuration parameters of the computing platform are identical.

5. The method of claim 3, wherein the function repository stores media processing functions including the NBMP function, and the requirements descriptor further indicates the estimator.

6. The method of claim 3, wherein the requirements descriptor of the NBMP function includes the estimator, the default value of the resource requirement parameter, the one or more default parameter values, the one or more current parameter values of the configuration parameters, the default input parameters, and the current input parameters.

7. The method of claim 1, further comprising:

requesting compute resources for instantiating the current instance of the NBMP function on a current computing platform with the one or more current parameter values of the configuration parameters and the current input parameters of the NBMP function based on the estimated current value of the resource requirement parameter; and instantiating the current instance of the NBMP function on the current computing platform using the requested compute resources.

8. An apparatus, comprising:

circuitry configured to:

receive a requirements descriptor of a network-based media processing (NBMP) function from a function repository of an NBMP framework, the requirements descriptor including a default value of a resource requirement parameter indicating a default resource requirement for instantiating a reference instance of the NBMP function on a computing platform with one or more default parameter values of configuration parameters and default input parameters of the NBMP function, the default input parameters of the NBMP function include at least one of a default picture height, a default frame rate, or a default picture width; and estimate a current value of the resource requirement parameter indicating a current resource requirement for instantiating a current instance of the NBMP function on the computing platform with one or more current parameter values of the configuration parameters and current input parameters of the NBMP function by scaling the default value of the resource requirement parameter included in the requirements descriptor using an estimator that is a function of at least one of (i) a ratio of the default picture height to a picture height of the current instance of the NBMP function, (ii) a ratio of the default frame rate to a frame rate of the current instance of the NBMP function, or (iii) a ratio of the default picture width to a picture width of the current instance of the NBMP function.

9. The apparatus of claim 8, wherein the resource requirement parameter is one of:

a computational performance parameter indicating a performance of a central processing unit (CPU) or a graphics processing unit (GPU), a memory size parameter, or a memory access bandwidth parameter indicating a bandwidth between a CPU and a memory.

10. The apparatus of claim 8, wherein the circuitry is configured to:

estimate the current value of the resource requirement parameter indicating the current resource requirement based on the following expression:

the current value=estimator*the default value, where the estimator is a function of the one or more current parameter values of the configuration parameters of the computing platform, (i) the ratio of the default picture height to the picture height of the current instance of the NBMP function, (ii) the ratio of the default frame rate to the frame rate of the current instance of the NBMP function, and (iii) the ratio of the default picture width to the picture width of the current instance of the NBMP function.

11. The apparatus of claim 10, wherein the estimator equals 1 when the one or more default parameter values and the one or more current parameter values of the configuration parameters of the computing platform are identical.

12. The apparatus of claim 10, wherein
the function repository stores media processing functions including the NBMP function, and
the requirements descriptor further indicates the estimator.

13. The apparatus of claim 10, wherein the requirements descriptor of the NBMP function includes the estimator, the default value of the resource requirement parameter, the one or more default parameter values, the one or more current parameter values of the configuration parameters, the default input parameters, and the current input parameters.

14. The apparatus of claim 8, wherein the circuitry is further configured to:
request compute resources for instantiating the current instance of the NBMP function on a current computing platform with the one or more current parameter values of the configuration parameters and the current input parameters of the NBMP function based on the estimated current value of the resource requirement parameter; and
instantiate the current instance of the NBMP function on the current computing platform using the requested compute resources.

15. A non-transitory computer-readable medium storing instructions that, when executed by a processor, cause the processor to perform a method, the method comprising:
receiving a requirements descriptor of a network-based media processing (NBMP) function from a function repository of an NBMP framework, the requirements descriptor including a default value of a resource requirement parameter indicating a default resource requirement for instantiating a reference instance of the NBMP function on a computing platform with one or more default parameter values of configuration parameters and default input parameters of the NBMP function, the default input parameters of the NBMP function include at least one of a default picture height, a default frame rate, or a default picture width; and
estimating a current value of the resource requirement parameter indicating a current resource requirement for instantiating a current instance of the NBMP function on the computing platform with one or more current parameter values of the configuration parameters and current input parameters of the NBMP function by scaling the default value of the resource requirement parameter using an estimator that is a function of at least one of (i) a ratio of the default picture height to a picture height of the current instance of the NBMP function, (ii) a ratio of the default frame rate to a frame rate of the current instance of the NBMP function, or (iii) a ratio of the default picture width to a picture width of the current instance of the NBMP function.

16. The non-transitory computer-readable medium of claim 15, wherein the resource requirement parameter is one of:
a computational performance parameter indicating a performance of a central processing unit (CPU) or a graphics processing unit (GPU),
a memory size parameter, or
a memory access bandwidth parameter indicating a bandwidth between a CPU and a memory.

17. The non-transitory computer-readable medium of claim 15, wherein the estimating the current value of the resource requirement parameter includes:
estimating the current value of the resource requirement parameter indicating the current resource requirement based on the following expression:
the current value=estimator*the default value,
where the estimator is a function of the one or more current parameter values of the configuration parameters of the computing platform, (i) the ratio of the default picture height to the picture height of the current instance of the NBMP function, (ii) the ratio of the default frame rate to the frame rate of the current instance of the NBMP function, and (iii) the ratio of the default picture width to the picture width of the current instance of the NBMP function.

18. The non-transitory computer-readable medium of claim 17, wherein the estimator equals 1 when the one or more default parameter values and the one or more current parameter values of the configuration parameters of the computing platform are identical.

19. The non-transitory computer-readable medium of claim 17, wherein
the function repository stores media processing functions including the NBMP function, and
the requirements descriptor further indicates the estimator.

20. The non-transitory computer-readable medium of claim 17, wherein the requirements descriptor of the NBMP function includes the estimator, the default value of the resource requirement parameter, the one or more default parameter values, the one or more current parameter values of the configuration parameters, the default input parameters, and the current input parameters.

* * * * *